US012215489B2

(12) United States Patent
Murayama

(10) Patent No.: US 12,215,489 B2
(45) Date of Patent: Feb. 4, 2025

(54) AUTOMATIC FAUCET DEVICE

(71) Applicant: The Yokohama Rubber Co., LTD., Tokyo (JP)

(72) Inventor: Hiroshi Murayama, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 105 days.

(21) Appl. No.: 17/995,959

(22) PCT Filed: Jan. 7, 2021

(86) PCT No.: PCT/JP2021/000319
§ 371 (c)(1),
(2) Date: Oct. 11, 2022

(87) PCT Pub. No.: WO2021/210224
PCT Pub. Date: Oct. 21, 2021

(65) Prior Publication Data
US 2023/0220656 A1    Jul. 13, 2023

(30) Foreign Application Priority Data
Apr. 14, 2020 (JP) ................................. 2020-072110

(51) Int. Cl.
*E03C 1/05* (2006.01)
*B64D 11/02* (2006.01)

(52) U.S. Cl.
CPC .............. *E03C 1/057* (2013.01); *B64D 11/02* (2013.01)

(58) Field of Classification Search
CPC ....................................... E03C 1/057
USPC ............................ 4/623, 675–678; 137/801
See application file for complete search history.

(56) References Cited

U.S. PATENT DOCUMENTS

| 5,893,387 A * | 4/1999 | Paterson ................. E03C 1/055 4/623 |
| 2015/0033469 A1 | 2/2015 | Ferrante |
| 2017/0247866 A1 | 8/2017 | Kessoku et al. |

FOREIGN PATENT DOCUMENTS

| EP | 0971079 A1 | 1/2000 |
| EP | 3202987 A1 | 8/2017 |
| JP | 05-054672 U1 | 7/1993 |
| JP | 10-131261 A | 5/1998 |
| JP | 11-350550 A | 12/1999 |
| JP | 2000-352089 A | 12/2000 |
| JP | 2004-300811 A | 10/2004 |
| JP | 4048891 B2 * | 2/2008 |
| JP | 2014-156696 A | 8/2014 |
| JP | 2016-108773 A | 6/2016 |
| WO | WO-2015079851 A1 * | 6/2015 ............. E03C 1/057 |

* cited by examiner

*Primary Examiner* — Tuan N Nguyen
(74) *Attorney, Agent, or Firm* — Thorpe North & Western

(57) ABSTRACT

An automatic faucet device includes one of a first detection unit, a second detection unit, and a third detection unit selected as a detection unit and attached to a detection unit attachment portion. Selecting the first detection unit obtains an automatic faucet device using a non-contact sensor, selecting the second detection unit obtains an automatic faucet device using a contact sensor, or selecting the third detection unit obtains an automatic faucet device using both the non-contact sensor and the contact sensor.

12 Claims, 13 Drawing Sheets

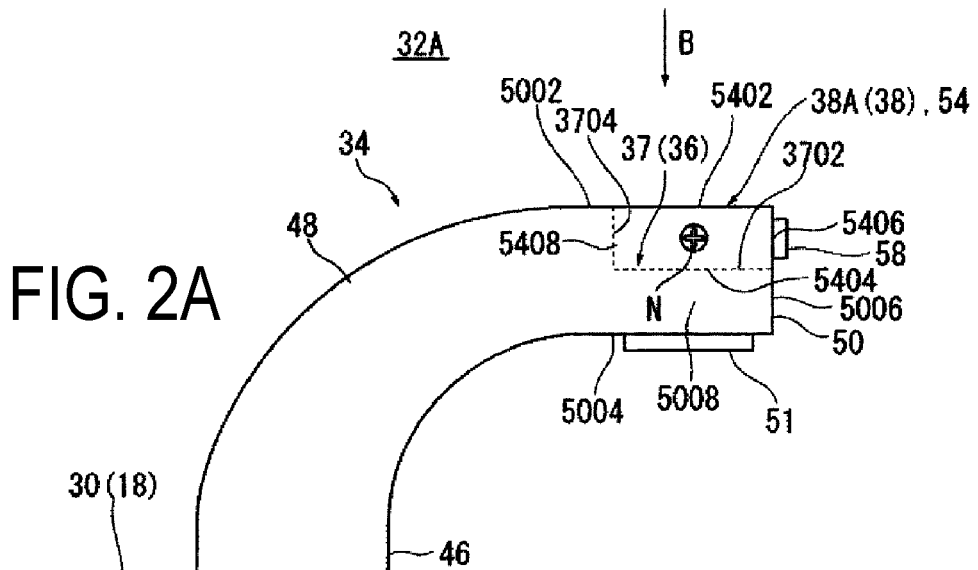
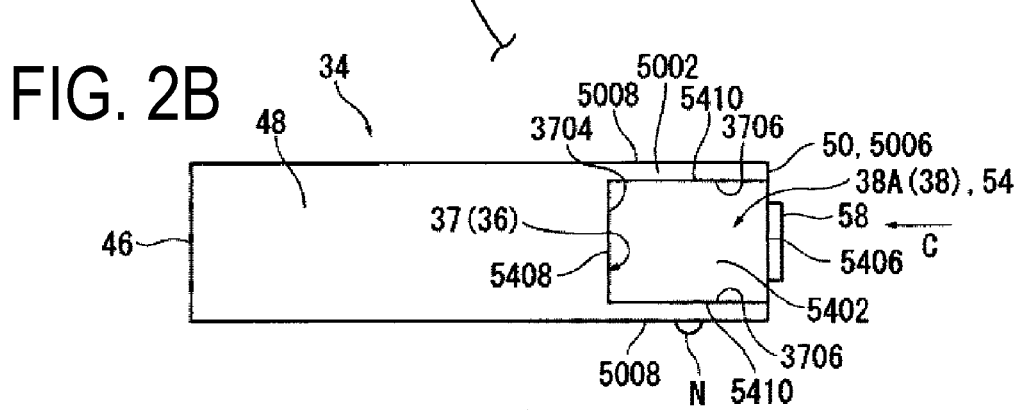
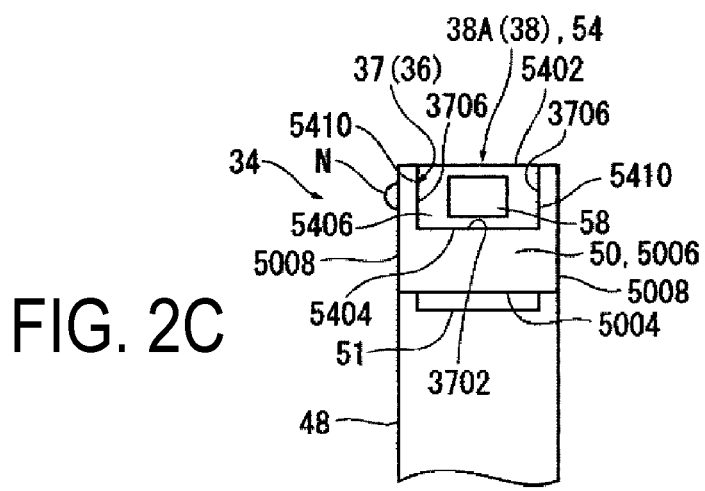

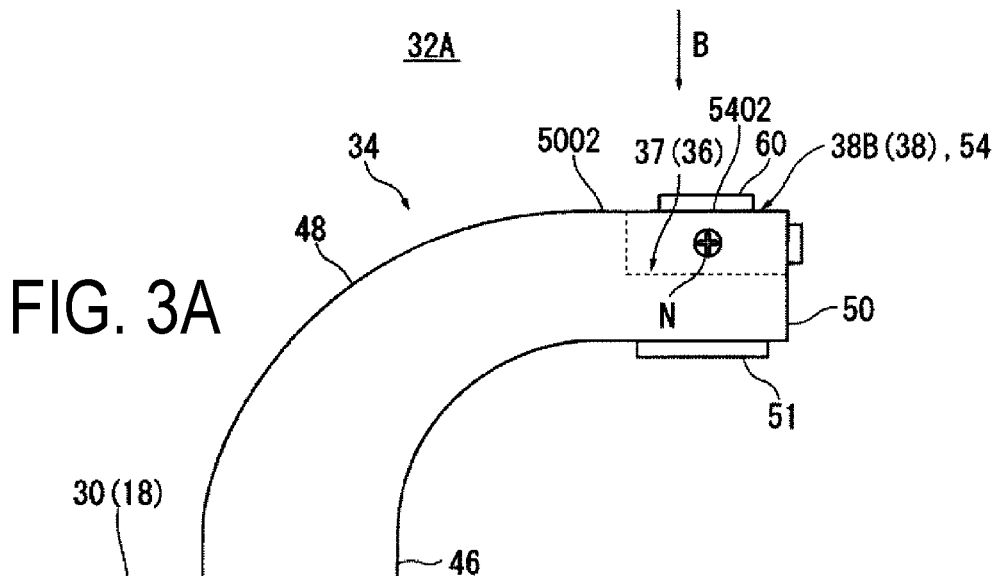
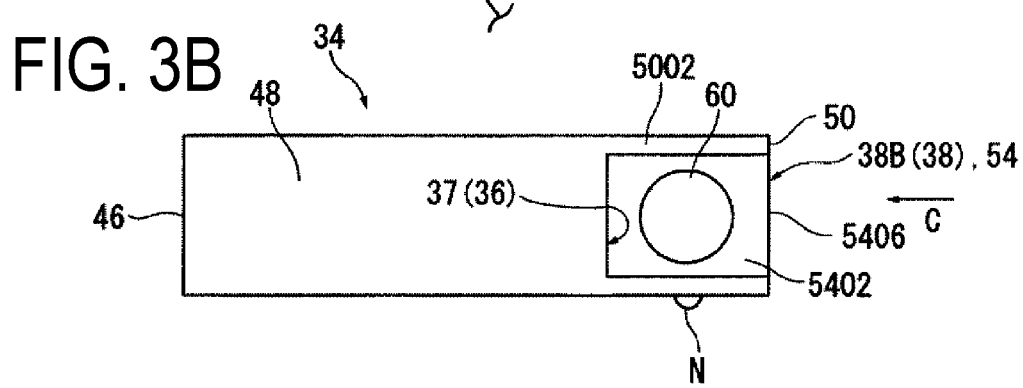
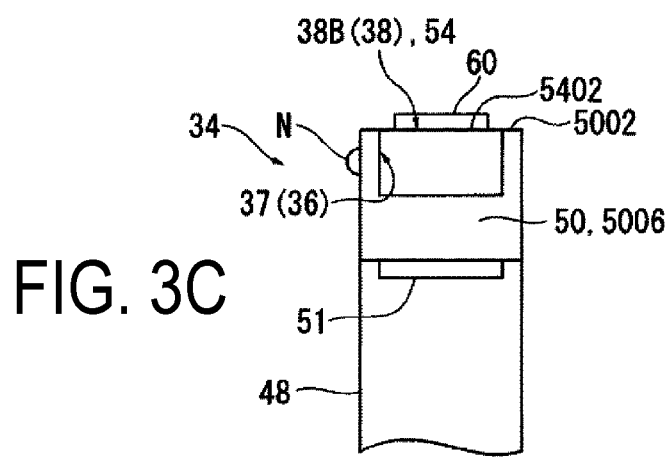

AUTOMATIC FAUCET DEVICE

TECHNICAL FIELD

The present technology relates to an automatic faucet device suitable for an aircraft lavatory unit and the like.

BACKGROUND ART

An automatic faucet device that detects part of a human body (finger) to discharge and stop water has been provided.

Such known automatic faucet devices include two types, one using a non-contact sensor, such as an infrared sensor that detects a finger in a non-contact manner, and the other using a contact sensor, such as a touch switch that detects a finger when contacted by the finger.

Non-contact sensors typically have a complex structure and high component cost and maintenance cost. Contact sensors have a simple structure and low component cost and maintenance cost.

When such an automatic faucet device is applied to, for example, an aircraft lavatory unit, however, there is a case where a customer requests an automatic faucet device using a non-contact sensor focusing on a hygiene aspect of a lavatory or a case where a customer requests an automatic faucet device using a contact sensor focusing on cost performance.

This has created a need to manufacture two types of automatic faucet devices, an automatic faucet device using a non-contact sensor and an automatic faucet device using a contact sensor, and there is room for improvement in providing, at low cost and in a short period of time, an automatic faucet device that meets specifications according to the customer's request.

SUMMARY

The present technology provides an automatic faucet device that meets specifications according to a customer's request and is advantageous in providing the automatic faucet device at low cost and in a short period of time.

An embodiment of the present technology is an automatic faucet device configured to be attached to a sink or a wall portion near the sink includes a faucet including a water discharge port, a detection unit attachment portion provided in the faucet, a detection unit that is detachably provided in the detection unit attachment portion and configured to detect part of a human body, and a control unit configured to switch between discharge and stop of water from the water discharge port in accordance with a detection signal output from the detection unit. The detection unit is either a first detection unit including a non-contact sensor configured to detect human body part in a non-contact manner or a second detection unit including a contact sensor configured to detect part of a human body when contacted by the part of the human body. The first detection unit and the second detection unit are both configured to be selectively attached to or detached from the detection unit attachment portion.

According to an embodiment of the present technology, either the first detection unit or the second detection unit can be selected as the detection unit and attached to the detection unit attachment portion. Accordingly, selecting the first detection unit obtains an automatic faucet device using a non-contact sensor, or selecting the second detection unit obtains an automatic faucet device using a contact sensor.

This is advantageous in that an automatic faucet device that meets specifications according to a customer's request can be inexpensively and easily obtained by just replacing the detection unit.

BRIEF DESCRIPTION OF DRAWINGS

FIG. 2A is a side view of an automatic faucet device to which a first detection unit is attached, FIG. 2B is a view in the direction of arrow B in FIG. 2A, and FIG. 2C is a view in the direction of arrow C in FIG. 2B.

FIG. 3A is a side view of an automatic faucet device to which a second detection unit is attached, FIG. 2B is a view in the direction of arrow B in FIG. 2A, and FIG. 2C is a view in the direction of arrow C in FIG. 2B.

FIG. 2C is a view in the direction of arrow C in FIG. 2B.

DETAILED DESCRIPTION

First Embodiment

Now, the present embodiment will be described with reference to the drawings.

First, an aircraft lavatory unit to which an automatic faucet device according to the present embodiment is applied will be described.

Figure 1:
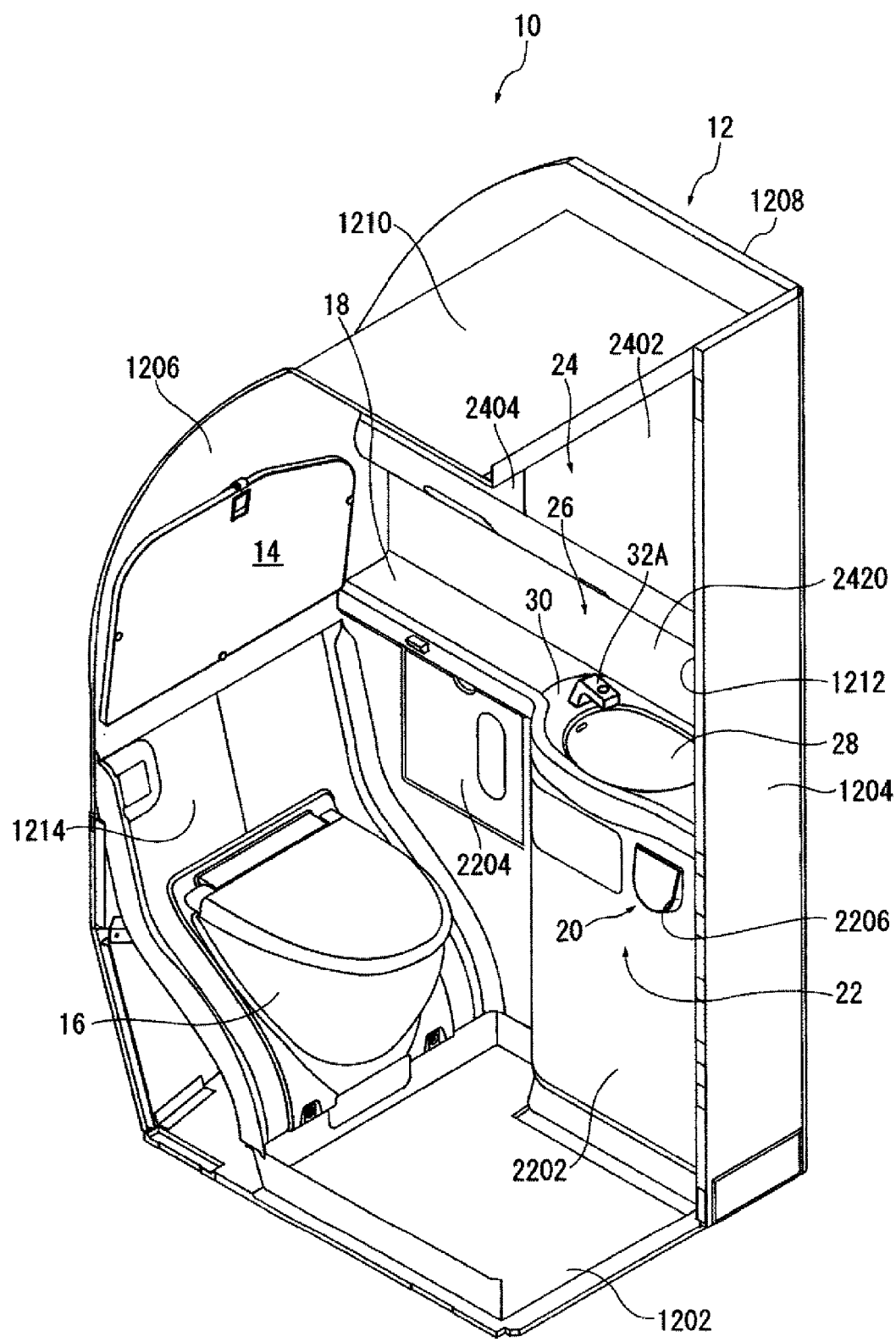
FIG. 1 is a perspective view of an aircraft lavatory unit to which an automatic faucet device according to a first embodiment is applied.
Figure 4A:
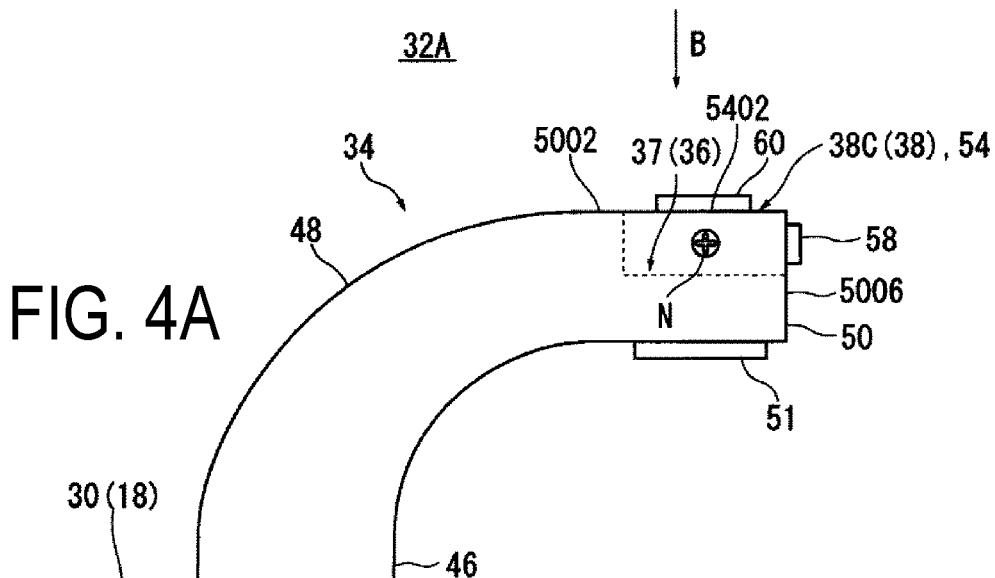
FIG. 4A is a side view of an automatic faucet device to which a third detection unit is attached.
Figure 4B:
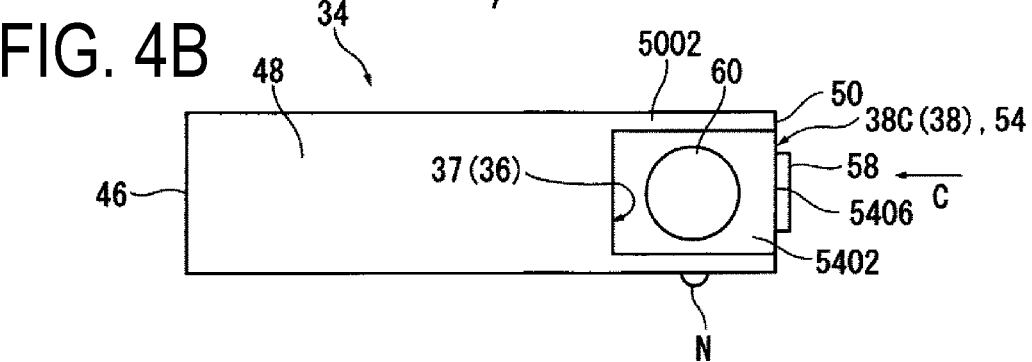
FIG. 4B is a view in the direction of arrow B in FIG. 2A.
Figure 4C:
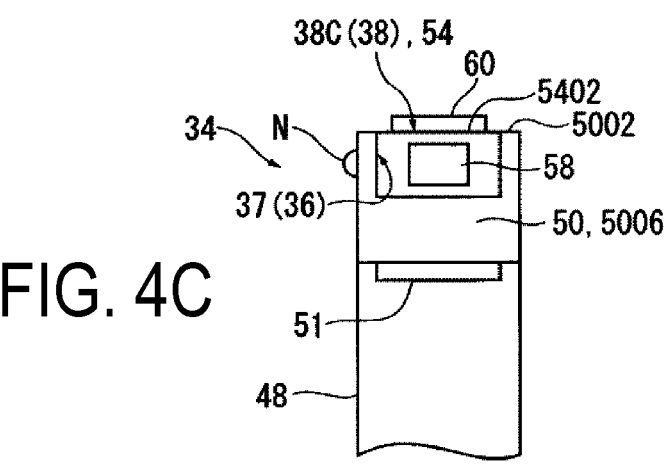

As illustrated in FIG. 1, an aircraft lavatory unit 10 includes a structural frame 12 including a bottom wall 1202, a plurality of wall plates rising from the bottom wall 1202, and a ceiling 1210 that form a lavatory 14 therein.

In the present embodiment, one of the plurality of wall plates is a front wall 1204, another one is a rear wall 1206 facing the front wall 1204, and the remaining two are a pair of side walls 1208 connecting two sides of the rear wall 1206 and corresponding two sides of the front wall 1204, the front wall 1204 includes an entrance 1212 that is opened and closed by a door, an inner wall 1214 is provided in front of the rear wall 1206, and a toilet 16 is provided on the bottom wall 1202 via the inner wall 1214.

FIG. 1 omits one side wall 1208 of the pair of side walls 1208 and the door that opens and closes the entrance.

A counter table 18 is provided in the middle of the other side wall 1208 of the pair of side walls 1208 in a height direction. Below the counter table 18 is a lower storage portion 22 for storing a trash can device 20 with a fire extinguishing function, equipment for the lavatory 14, and the like. The lower storage portion 22 can be opened and closed by a plurality of doors 2202 and 2204. In FIG. 1, a reference sign 2206 indicates a trash feeding port.

Above the counter table 18 is an upper storage portion 24 for storing equipment for the lavatory 14 such as tissues. The upper storage portion 24 is opened and closed by a plurality of mirrored doors 2402 and 2404.

A wash basin 26 is provided in a location on the counter table 18 near the front wall 1204.

The wash basin 26 includes a hand wash bowl 28, a sink 30 configured in a location on the counter table 18 around the hand wash bowl 28, and an automatic faucet device 32A that is provided on the sink 30, the automatic faucet device 32A and enables water discharge into the hand wash bowl 28.

The automatic faucet device 32A detects part of a human body (finger) to discharge and stop water.

Figure 5:
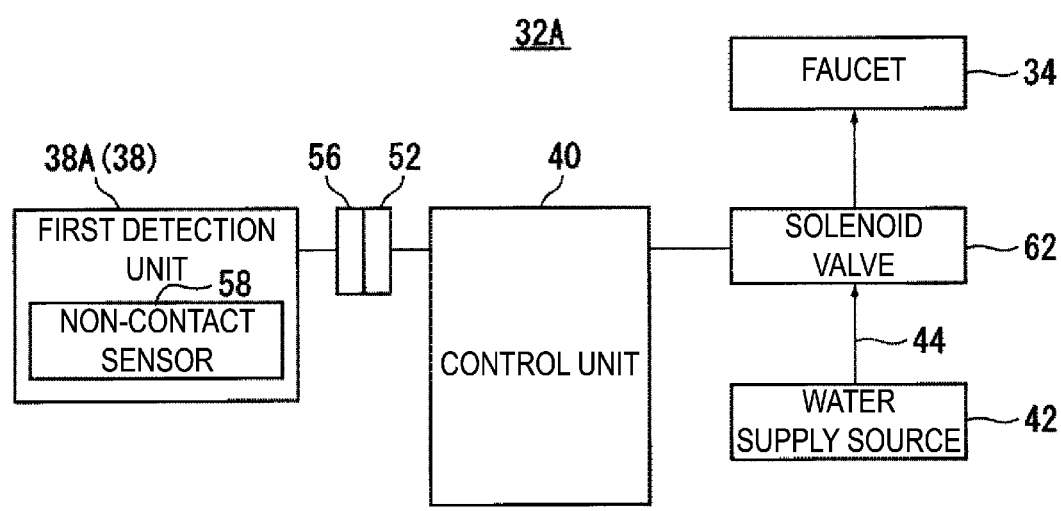
FIG. 5 is a block diagram illustrating a configuration of a control system of the automatic faucet device to which the first detection unit is attached.
Figure 6:
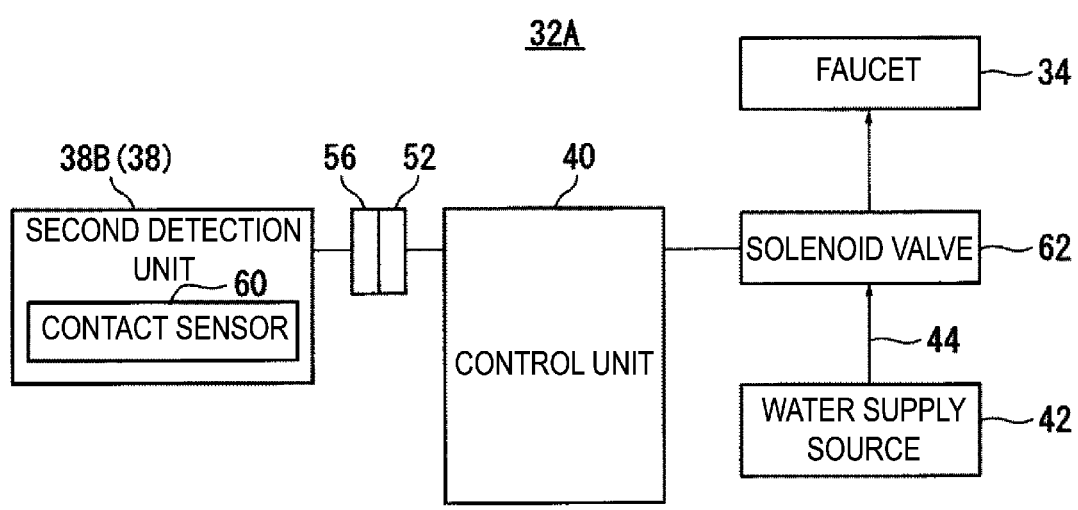
FIG. 6 is a block diagram illustrating a configuration of a control system of the automatic faucet device to which the second detection unit is attached.
Figure 7:
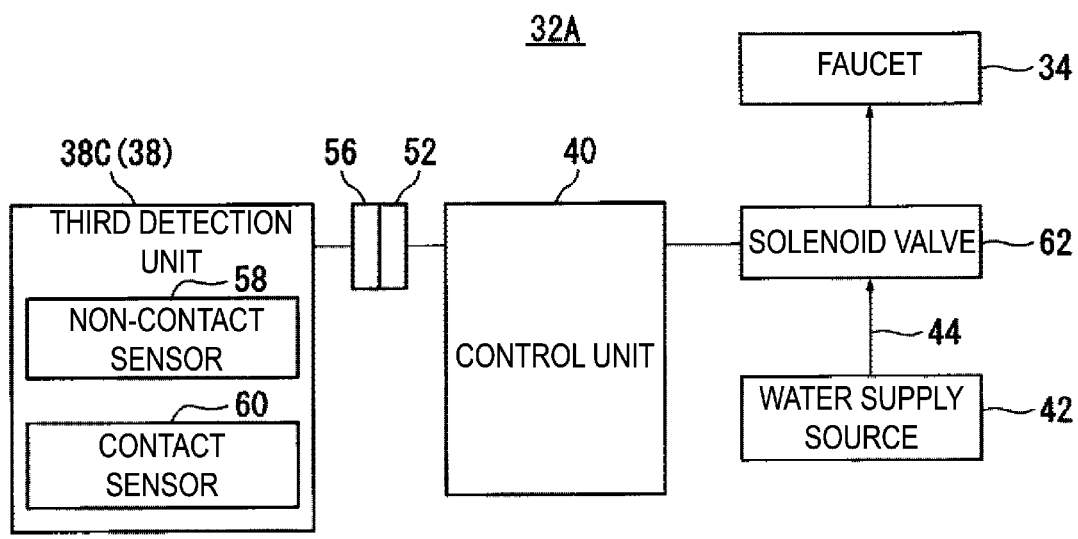
FIG. 7 is a block diagram illustrating a configuration of a control system of the automatic faucet device to which the third detection unit is attached.
Figure 8:
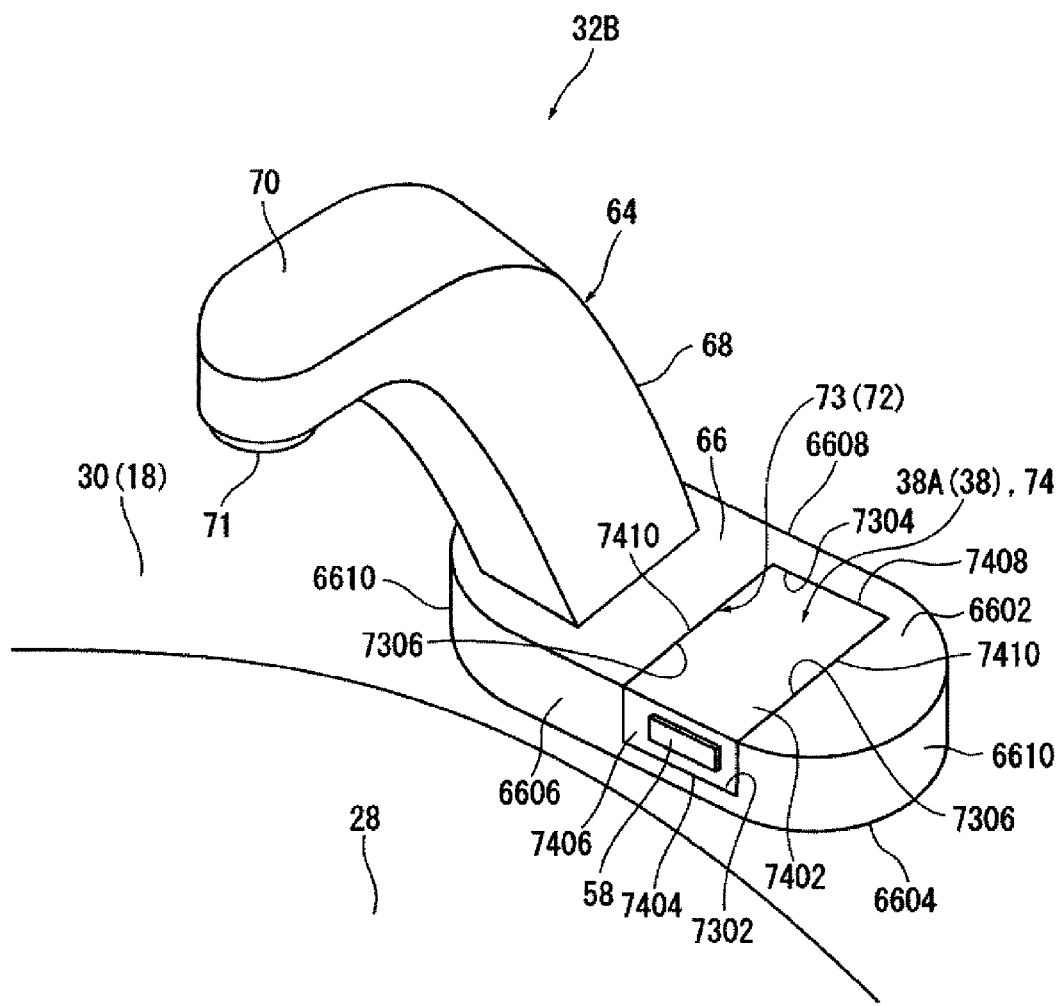
FIG. 8 is a perspective view of an automatic faucet device according to a second embodiment, illustrating a state in which the first detection unit is attached.
Figure 9:
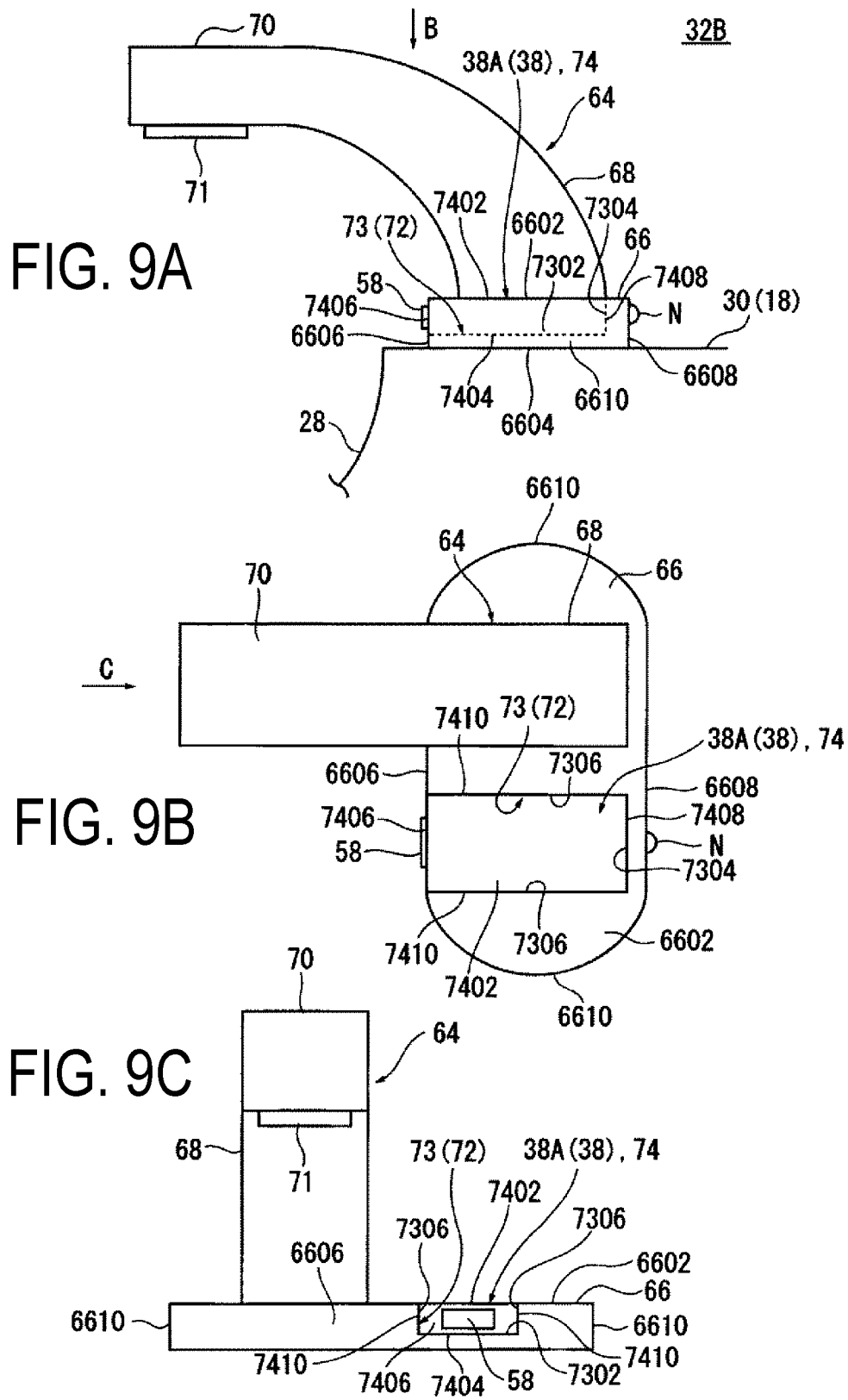
FIG. 9A is a side view of the automatic faucet device to which the first detection unit is attached.
FIG. 9B is a view in the direction of arrow B in FIG. 9A.
FIG. 9C is a view in the direction of arrow C in FIG. 9B.
Figure 10:
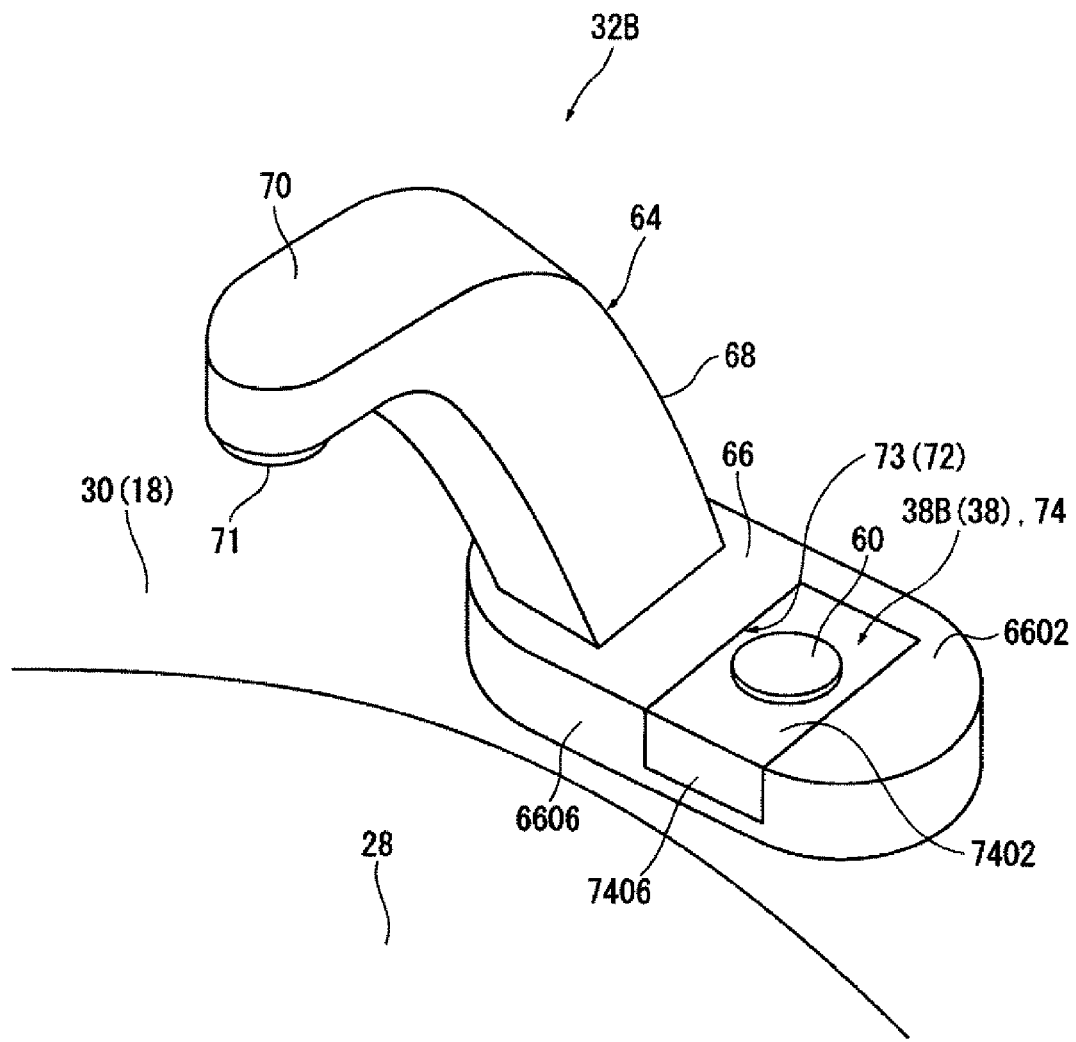
FIG. 10 is a perspective view of an automatic faucet device according to the second embodiment, illustrating a state in which the second detection unit is attached.
Figure 11A:
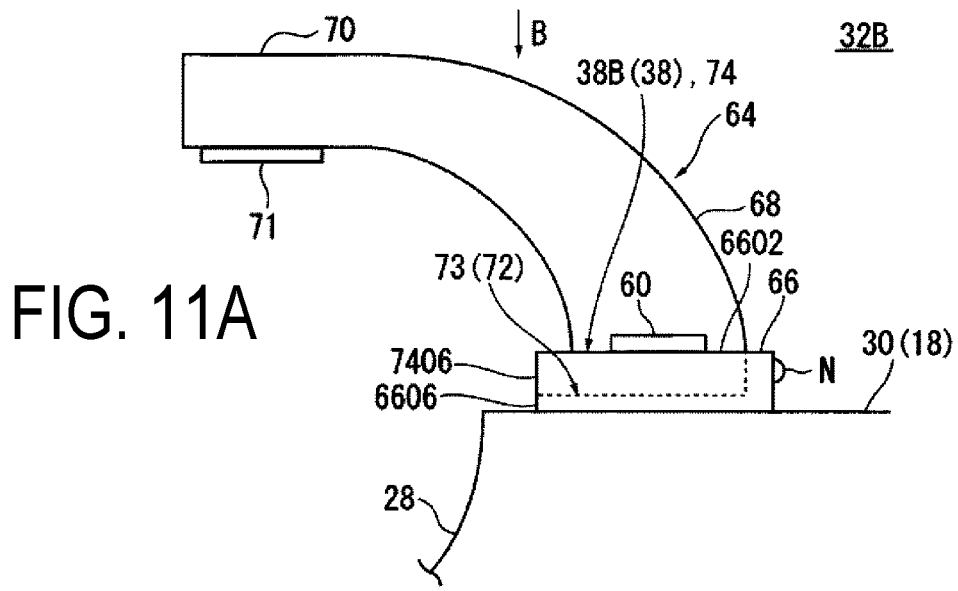
FIG. 11A is a side view of the automatic faucet device to which the second detection unit is attached.
Figure 11B:
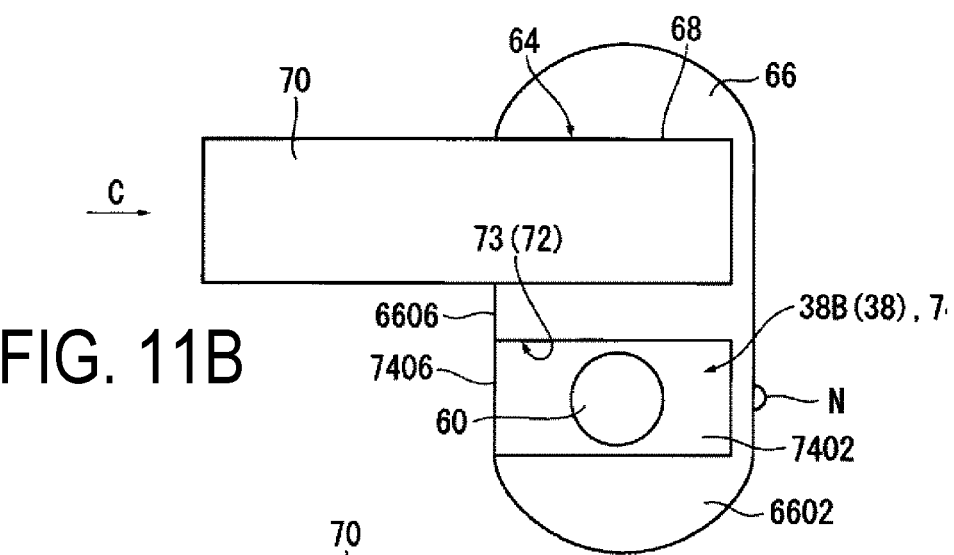
FIG. 11B is a view in the direction of arrow B in FIG. 11A.
Figure 11C:
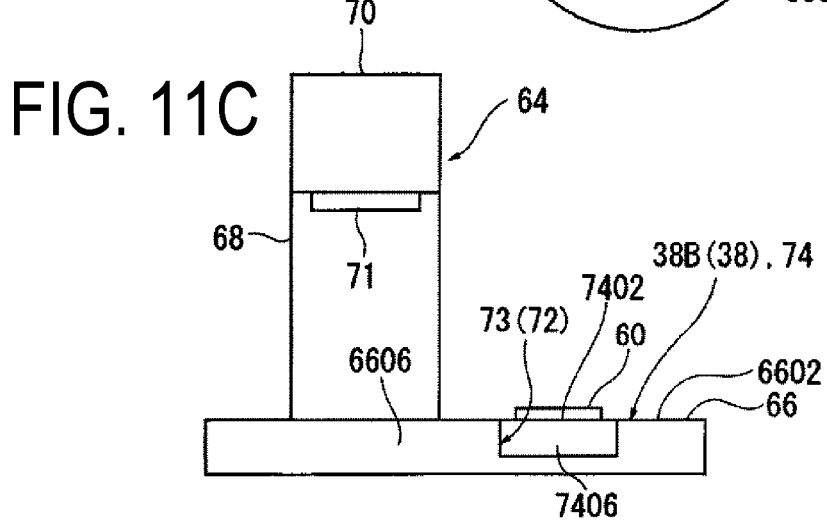
FIG. 11C is a view in the direction of arrow C in FIG. 11B.
Figure 12:
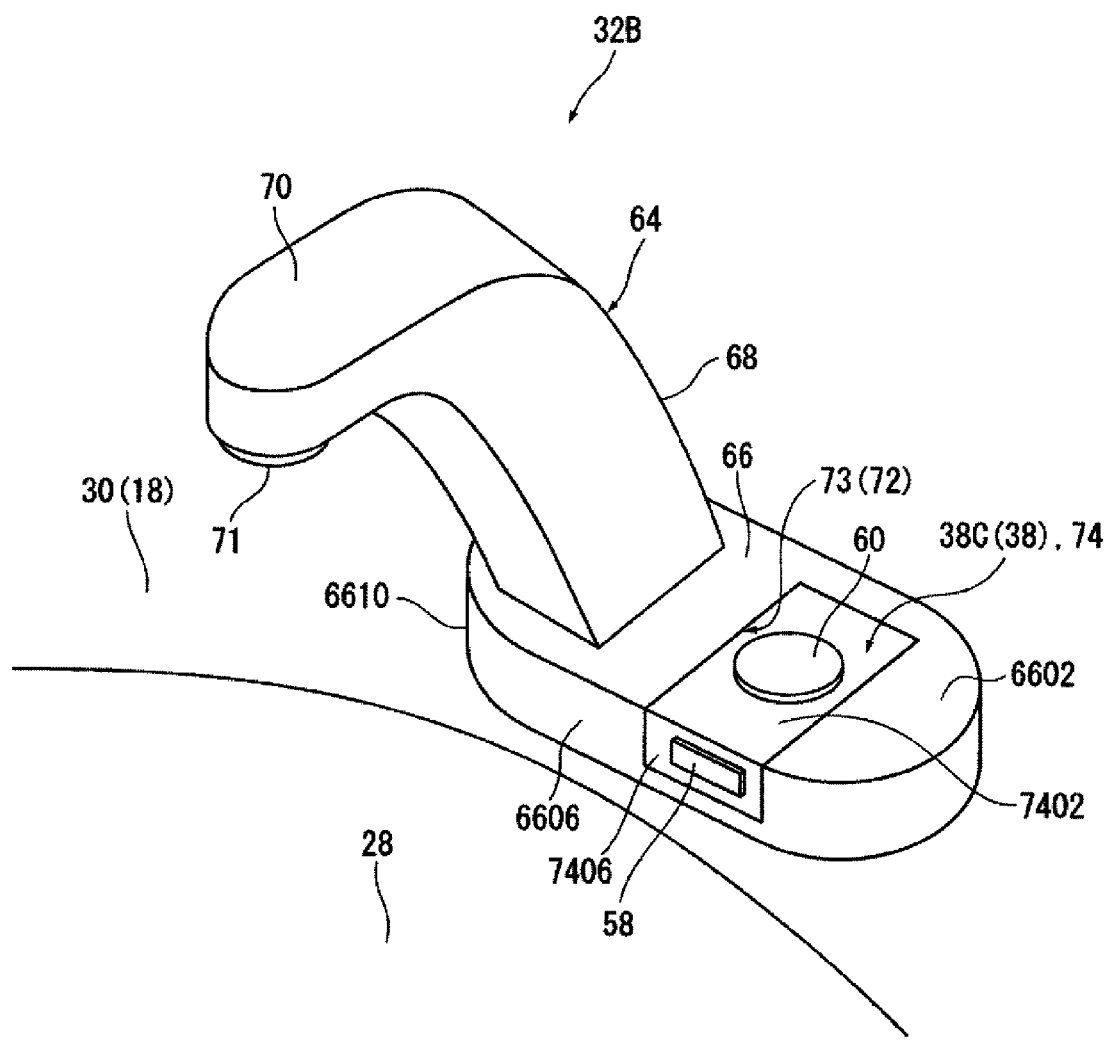
FIG. 12 is a perspective view of an automatic faucet device according to the second embodiment, illustrating a state in which the third detection unit is attached.
Figure 13A:
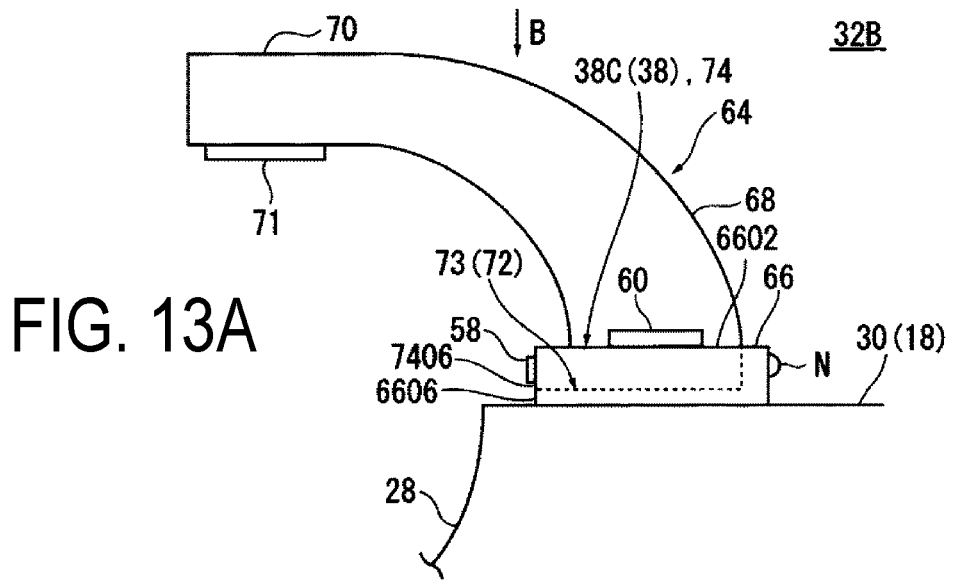
FIG. 13A is a side view of the automatic faucet device to which the third detection unit is attached.
Figure 13B:
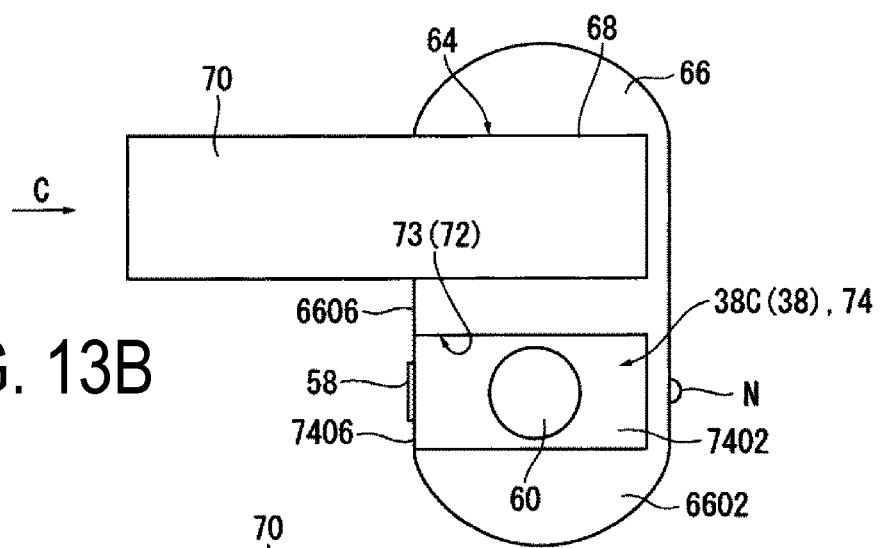
FIG. 13B is a view in the direction of arrow B in FIG. 13A.
Figure 13C:
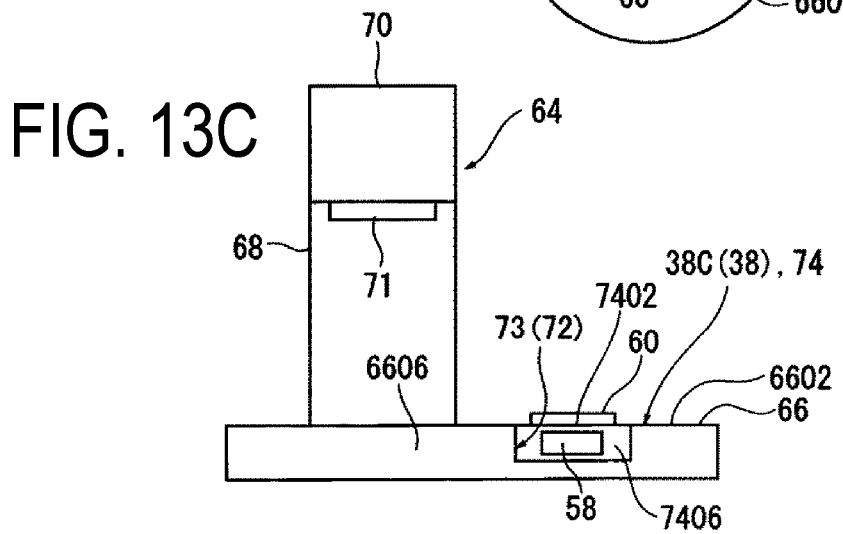
FIG. 13C is a view in the direction of arrow C in FIG. 13B.

As illustrated in FIGS. 2 and 5, the automatic faucet device 32A includes a faucet 34, a detection unit attachment portion 36, a detection unit 38, and a control unit 40.

The faucet 34 discharges water supplied from a water supply source 42 via a water supply channel 44.

The faucet 34 is made of a variety of known materials, such as a metal or synthetic resin.

As illustrated in FIG. 2, the faucet 34 includes a base portion 46 attached to an upper surface of the sink 30 or a wall portion near the sink 30 (in the present embodiment, for example, a wall portion 2420 connecting the counter table 18 and the upper storage portion 24 as), an extending portion 48 extending above the hand wash bowl 28 from the base portion 46, and a water discharge portion 50 including a water discharge port 51 that is provided on a tip portion extending in a substantially horizontal direction of the extending portion 48 and includes the water discharge port 51 directed toward an inside of the hand wash bowl 28.

The water discharge portion 50 includes an upper surface 5002 facing upward, a lower surface 5004 facing downward, that is, toward the inside of the hand wash bowl 28, a front surface 5006 facing in front of the water discharge portion 50, and a pair of left and right side surfaces 5008 connecting the upper surface 5002, the lower surface 5004, and the front surface 5006, and the water discharge port is provided on the lower surface 5004.

As illustrated in FIGS. 2A, 2B and 2C, the detection unit attachment portion 36 is a location to which the detection unit 38 described below is detachably attached.

In the present embodiment, the detection unit attachment portion 36 is provided on the upper surface 5002 of the water discharge portion 50 and is formed of a recess portion 37 that is notched from the upper surface 5002 to the front surface 5006 and opening upward and forward and has a rectangular shape in a plan view.

The recess portion 37 includes a bottom surface 3702 facing upward, a rear surface 3704 rising from a back end of the bottom surface 3702, and a pair of inner surfaces 3706 rising from two sides of the bottom surface 3702.

An attachment-portion-side connector 52 (see FIG. 5) is provided exposed to the recess portion 37.

The attachment-portion-side connector 52 (see FIG. 5) is for transmitting detection signals of a non-contact sensor 58 or a contact sensor 60 of the detection unit 38, which will be described below. In other words, the attachment-portion-side connector 52 is connected to the non-contact sensor 58 or the contact sensor 60.

Further, a case 54 of the detection unit 38 is fitted into the recess portion 37, and a screw N penetrating one of the pair of side surfaces 5008 of the water discharge portion 50 is fastened into a female screw of the case 54 to detachably attach the detection unit 38 to the recess portion 37.

Note that the detection unit 38 can be attached to the detection unit attachment portion 36 using various known fixing structures, such as engagement of an engaging claw with an engaging recess portion other than screw fastening.

This allows the detection unit 38 to be easily detached from the recess portion 37 and replaced with another detection unit 38.

The detection unit 38 detects part of a human body.

In the present embodiment, the detection unit 38 is any one of a first detection unit 38A, a second detection unit 38B, and a third detection unit 38C, which are selectively used.

The case 54 of each detection unit 38 is made of various known materials such as a metal or synthetic resin.

As illustrated in FIGS. 2A, 2B and 2C, the case 54 has a flat rectangular plate shape and includes, when attached to the recess portion 37, an upper surface 5402 facing upward, a lower surface 5404 facing downward, a front surface 5406 facing forward, a rear surface 5408 facing backward, and a pair of side surfaces 5410 connecting the upper surface 5402, the lower surface 5404, the front surface 5406, and the rear surface 5408.

The case 54 is attached to the recess portion 37 with the lower surface 5404, the rear surface 5408, and the pair of side surfaces 5410 of the case 54 respectively fitted to the bottom surface 3702, the rear surface 3704, and the pair of inner surfaces 3706 of the recess portion 37.

In the present embodiment, each detection unit 38 is selectively attached to the recess portion 37, the upper surface 5002 of the water discharge portion 50 and the upper surface 5402 of the case 54 are connected on the same plane, and the front surface 5006 of the water discharge portion 50 and the front surface 5406 of the case 54 are connected on the same plane, allowing a feeling of unity to be obtained.

Note that, as illustrated in FIG. 5, the case 54 includes a detection-unit-side connector 56 connected to the attachment-portion-side connector 52 by attaching the case 54 to the recess portion 37.

As illustrated in FIGS. 2A, 2B and 2C and FIG. 5, the first detection unit 38A includes the non-contact sensor 58 that detects part of a human body in a non-contact manner.

Such a non-contact sensor 58 can use a known sensor such as an infrared sensor that irradiates part of a human body with detection light made of infrared light and detects the part of the human body in accordance with reflected light or a capacitive non-contact sensor that detects part of a human body in a non-contact manner with a change in electrostatic capacitance due to the approach of the part of the human body.

In the present embodiment, the non-contact sensor 58 is an infrared sensor and is supported on the front surface 5406 of the case 54 of the first detection unit 38A.

With the first detection unit 38A attached to the recess portion 37, the forward of the water discharge portion 50 is irradiated with detection light, allowing for reliably irradiating the user's fingers inserted into the hand wash bowl 28.

As illustrated in FIGS. 3A, 3B and 3C and FIG. 6, the second detection unit 38B includes the contact sensor 60 that detects part of a human body when contacted by the part of the human body.

Such a contact sensor 60 can use a known sensor such as a touch switch that detects finger contact or a capacitive touch sensor that detects part of a human body with a change in electrostatic capacitance due to finger contact.

In the present embodiment, the contact sensor 60 is a touch switch and is supported on the upper surface 5402 of the case 54 of the second detection unit 38B.

With the second detection unit 38B attached to the recess portion 37, the contact sensor 60 protrudes upward from the upper surface 5002 of the water discharge portion 50, allowing the user's fingers to easily contact the contact sensor 60.

As illustrated in FIGS. 4A, 4B and 4C and FIG. 7, the third detection unit 38C includes both the non-contact sensor 58 and the contact sensor 60 and serves as both the first detection unit 38A and the second detection unit 38B.

In the present embodiment, the non-contact sensor 58 is an infrared sensor and is provided on the front surface 5406 of the case 54 of the third detection unit 38C, whereas the contact sensor 60 is a touch switch and is supported on the upper surface 5402 of the case 54 of the third detection unit 38C.

With the third detection unit 38C attached to the recess portion 37, the forward of the water discharge portion 50 is irradiated with detection light, allowing for reliably irradiating the user's fingers inserted into the hand wash bowl 28.

Also, with the third detection unit 38C attached to the recess portion 37, the contact sensor 60 protrudes upward from the upper surface 5002 of the water discharge portion 50, allowing the user's fingers to easily contact the contact sensor 60.

Such a third detection unit 38C allows both the non-contact sensor 58 and the contact sensor 60 to be used, thus advantageously improving usability.

When the non-contact sensor 58 is compared with the contact sensor 60, the non-contact sensor 58 is typically complex in structure, expensive, and less durable, whereas the contact sensor 60 is simple in structure, less expensive, and less prone to failure. Thus, the cost including both the component cost and the maintenance cost increases in the order of the second detection unit 38B, the first detection unit 38A, and the third detection unit 38C.

The control unit 40 may be provided in the faucet 34. In the present embodiment, the control unit 40 is provided in a location below the counter table 18 near the faucet 34 and connected to the attachment-portion-side connector 52 via a cable, which is not illustrated.

The control unit 40 switches between discharge and stop of water from the water discharge port 51 in accordance with a detection signal output from the detection unit 38 and supplied via the detection-unit-side connector 56, the attachment-portion-side connector 52, and the cable.

As illustrated in FIG. 5, the present embodiment includes a solenoid valve 62 in the water supply channel 44 that supplies water to the faucet 34. The control unit 40, upon receiving a detection signal indicating that the detection unit 38 has detected part of a human body, opens the solenoid valve 62 for a predetermined valve opening time to discharge water from the water discharge port 51, and closes the solenoid valve 62 upon completion of the valve opening time.

In this way, opening the valve for a certain opening time allows a predetermined amount of water to be discharged from the faucet 34.

According to the present embodiment, any one of the first detection unit 38A, the second detection unit 38B, and the third detection unit 38C can be selected as the detection unit 38 to be attached to the detection unit attachment portion 36.

Thus, selecting the first detection unit 38A obtains an automatic faucet device 32A using the non-contact sensor 58, selecting the second detection unit 38B obtains an automatic faucet device 32A using the contact sensor 60, or selecting the third detection unit 38C obtains an automatic faucet device 32A using both the non-contact sensor 58 and the contact sensor 60.

Accordingly, an automatic faucet device 32A that meets specifications according to a customer's request can be obtained inexpensively and easily by just replacing the detection unit 38.

For example, as illustrated in FIGS. 2A, 2B and 2C and FIG. 5, for a customer who hates to touch the automatic faucet device 32A with their fingers due to hygiene concerns of the lavatory 14, the automatic faucet device 32A to which the first detection unit 38A is attached can be provided.

Further, as illustrated in FIGS. 3A, 3B and 3C and FIG. 6, for a customer who focuses on cost reduction of the automatic faucet device 32A, an automatic faucet device 32A to which the second detection unit 38B is attached can be provided.

Further, as illustrated in FIGS. 4A, 4B and 4C and FIG. 7, for a customer who focuses on usability, an automatic faucet device 32A to which the third detection unit 38C is attached can be provided.

Accordingly, there is no need to manufacture the automatic faucet device 32A for each type of the detection unit 38. This is advantageous in providing, at a low cost and in a short delivery time, an automatic faucet device 32A that meets specifications according to a customer's request.

Even when the specifications of an automatic faucet device 32A already installed are changed, replacing the detection unit 38 already installed with a detection unit 38 having different specifications is only required, and there is no need to replace the whole automatic faucet device 32A. This is advantageous in reducing the cost and period required for replacement.

Further, according to the present embodiment, the detection unit attachment portion 36 is provided on the upper surface 5002 of the water discharge portion 50, allowing the position of the detection unit 38 attached to the detection unit attachment portion 36 to be recognized at once and allowing fingers to approach the detection unit 38 or easily operate, for example, touching the detection unit 38. This is advantageous in improving the operability of the automatic faucet device 32A.

Also, according to the present embodiment, the detection unit attachment portion 36 is formed of the recess portion 37 opening upward on the upper surface 5002 of the water discharge portion 50, and the detection unit 38 includes the case 54 supporting one or both of the non-contact sensor 58 and the contact sensor 60, and the case 54 is detachably attached to the recess portion 37.

This eliminates the need to use a dedicated attachment component in attaching the detection unit 38 and is advantageous in reducing the size and cost of the automatic faucet device 32A.

Also, according to the present embodiment, the recess portion 37 includes the attachment-portion-side connector 52 connected to the control unit 40, and the case 54 includes the detection-unit-side connector 56 that is connected to one or both of the non-contact sensor 58 and the contact sensor 60 and configured to be coupled to the attachment-portion-side connector 52.

Thus, just attaching the case 54 to the recess portion 37 can easily connect the non-contact sensor 58 or the contact sensor 60 with the control unit 40, or just detaching the case 54 from the recess portion 37 can easily disconnect the non-contact sensor 58 or the contact sensor 60 from the control unit 40. This eliminates the need for troublesome wiring work in attaching and detaching the detection unit 38 and is advantageous in improving the efficiency of work in attaching, detaching, and replacing the detection unit 38.

Second Embodiment

Next, a second embodiment will be described with reference to FIGS. 8 to 13.

Note that, in the embodiment described below, elements and members similar to those of the first embodiment have reference signs identical to those of the first embodiment, and descriptions thereof are omitted.

The second embodiment differs from the first embodiment in the location of the faucet 34 where a detection unit attachment portion 72 is provided.

As illustrated in FIG. 8, FIGS. 9A, 9B and 9C, a faucet 64 includes a base plate portion 66 attached to an upper surface of a sink 30 or a wall portion near the sink 30, an extending portion 68 extending above a hand wash bowl 28 from the base plate portion 66, and a water discharge portion 70 that is provided on a tip portion extending in a substantially horizontal direction of the extending portion 68 and includes a water discharge port 71 directed toward an inside of the hand wash bowl 28.

Note that the faucet 64 including the base plate portion 66 is made of various known materials such as a metal or synthetic resin, as in the first embodiment.

In the present embodiment, the base plate portion 66 has a flat oval plate shape having a contour larger than that of the extending portion 68.

The base plate portion 66 includes an upper surface 6602 facing upward, a lower surface 6604 facing downward, a front surface 6606 facing a hand wash bowl 28 side, a rear surface 6608 facing in a direction opposite the front surface 6606, and a pair of side surfaces 6610 that are curved and connect the upper surface 6602, the lower surface 6604, the front surface 6606, and the rear surface 6608.

The extending portion 68 rises from a location on the upper surface 6602 on one side of the base plate portion 66 in a longitudinal direction.

The base plate portion 66 and the extending portion 68 may be provided integrally, or the base plate portion 66 and the extending portion 68 may be provided as separate bodies, and for example, the extending portion 68 may be inserted into a hole provided in the base plate portion 66.

In the present embodiment, the detection unit attachment portion 72 is provided in the base plate portion 66 aligned with the extending portion 68.

Specifically, the detection unit attachment portion 72 is provided in a location on the upper surface 6602 on the other side of the base plate portion 66 in the longitudinal direction and is formed of a recess portion 73 that is notched from the upper surface 6602 to the front surface 6606 and opening upward and forward and has a rectangular shape in a plan view.

The recess portion 73 includes a bottom surface 7302 facing upward, a rear surface 7304 rising from a back end of the bottom surface 7302, and a pair of inner surfaces 7306 rising from two sides of the bottom surface 7302.

An attachment-portion-side connector 52 (see FIG. 5) is provided exposed to the recess portion 73 or protrudes into the recess portion 73.

Additionally, a case 74 of a detection unit 38 is fitted into the recess portion 73, and a screw N penetrating the rear surface 6608 of the base plate portion 66 is fastened into a female thread of the case 74. Thus, the detection unit 38 is detachably attached to the detection unit attachment portion 72.

Note that the detection unit 38 can be attached to the recess portion 73 using various known fixing structures, as in the first embodiment.

Thus, the second embodiment also allows the detection unit 38 to be easily detached from the recess portion 73 and replaced with another detection unit 38.

As in the first embodiment, the detection unit 38 is any one of a first detection unit 38A, a second detection unit 38B, and a third detection unit 38C, which are selectively used.

As illustrated in FIGS. 9A, 9B and 9C, the case 74 has a flat rectangular plate shape and includes, when attached to the detection unit attachment portion 72, an upper surface 7402 facing upward, a lower surface 7404 facing downward, a front surface 7406 directed toward the hand wash bowl 28 side, a rear surface 7408 facing in a direction opposite the front surface 7406, and a pair of side surfaces 7410 connecting the upper surface 7402, the lower surface 7404, the front surface 7406, and the rear surface 7408.

The case 74 is attached to the detection unit attachment portion 72 with the lower surface 7404, the rear surface 7408, and the pair of side surfaces 7410 of the case 74 respectively fitted to the bottom surface 7302, the rear surface 7304, and the pair of inner surfaces 7306 of the recess portion 73.

In the present embodiment, each detection unit 38 is selectively attached to the recess portion 73, the upper surface 6602 of the base plate portion 66 and the upper surface 7402 of the case 74 are connected on the same plane, and the front surface 6606 of the base plate portion 66 and the front surface 7406 of the case 74 are connected on the same plane, allowing a feeling of unity to be obtained.

As illustrated in FIG. 5, the case 74 includes a detection-unit-side connector 56 that is connected to the attachment-portion-side connector 52 by attaching the case 74 to the recess portion 73.

As illustrated in FIG. 8, FIGS. 9A, 9B and 9C, the first detection unit 38A includes a non-contact sensor 58 that detects part of a human body in a non-contact manner. In the present embodiment, the non-contact sensor 58 is an infrared sensor, and the non-contact sensor 58 is provided on the front surface 7406 of the case 74 of the first detection unit 38A.

With the first detection unit 38A attached to the recess portion 73, the forward of the base plate portion 66 is irradiated with detection light, allowing for reliably irradiating the user's fingers inserted into the hand wash bowl 28.

As illustrated in FIG. 10, FIGS. 11A, 11B and 11C, the second detection unit 38B includes a contact sensor 60 that detects part of a human body when contacted by the part of the human body. In the present embodiment, the contact sensor 60 is a touch switch, and the contact sensor 60 is provided on the upper surface 7402 of the case 74 of the second detection unit 38B.

With the second detection unit 38B attached to the recess portion 73, the contact sensor 60 protrudes upward from the upper surface 6602 of the base plate portion 66, allowing the user's fingers to easily contact the contact sensor 60.

As illustrated in FIG. 12, FIGS. 13A, 13B and 13C, the third detection unit 38C includes both the non-contact sensor 58 and the contact sensor 60 and serves as both the first detection unit 38A and the second detection unit 38B.

In the present embodiment, the non-contact sensor 58 is an infrared sensor, and the non-contact sensor 58 is provided on the front surface 7406 of the case 74 of the third detection unit 38C, whereas the contact sensor 60 is a touch switch and is provided on the upper surface 7402 of the case 74 of the third detection unit 38C.

With the third detection unit 38C attached to the recess portion 73, the forward of the base plate portion 66 is irradiated with detection light, allowing for reliably irradiating the user's fingers inserted into the hand wash bowl 28.

Also, with the third detection unit 38C attached to the recess portion 73, the contact sensor 60 protrudes upward from the upper surface 6602 of the base plate portion 66, allowing the user's fingers to easily contact the contact sensor 60.

Such a third detection unit 38C allows both the non-contact sensor 58 and the contact sensor 60 to be used, thus advantageously improving usability.

The control unit 40 controls discharge and stop of water in accordance with a detection signal of the detection unit 38, as in the first embodiment.

Such a second embodiment exhibits the same effects as the first embodiment.

According to the second embodiment, the detection unit attachment portion 72 is provided in the base plate portion 66 aligned with the extending portion 68, allowing the position of the detection unit 38 attached to the detection unit attachment portion 72 to be recognized at once and allowing fingers to approach the detection unit 38 or easily operate, for example, touching the detection unit 38. This is advantageous in improving the operability of the automatic faucet device 32B.

Also, the detection unit attachment portion 72 is provided on the upper surface 6602 of the base plate portion 66, and thus even when the second detection unit 38B or the third detection unit 38C that is attached to the detection unit attachment portion 72 is pressed repeatedly with a large force, the force is transmitted from the base plate portion 66 to the sink 30, and repeated applications of an excessive force to the sink 64 is avoided. This is advantageous in improving the durability of the faucet 64.

Further, according to the second embodiment, the detection unit attachment portion 72 is formed of the recess portion 73 provided in the base plate portion 66, and the detection unit 38 includes the case 54 supporting one or both of the non-contact sensor 58 and the contact sensor 60, with the case 54 detachably attached to the recess portion 73.

This eliminates the need to use a dedicated attachment component in attaching the detection unit 38 and is advantageous in reducing the size and cost of the automatic faucet device 32B.

Further, the second embodiment includes, as in the first embodiment, the attachment-portion-side connector 52 in the recess portion 73, and the case 54 includes the detection-unit-side connector 56 configured to be coupled to the attachment-portion-side connector 52. Thus, just attaching the case 54 to the recess portion 73 can easily connect the non-contact sensor 58 or the contact sensor 60 with the control unit 40, or just detaching the case 54 from the recess portion 73 can easily disconnect the non-contact sensor 58 or the contact sensor 60 from the control unit 40. This eliminates the need for troublesome wiring work in attaching and detaching the detection unit 38 and is advantageous in improving the efficiency of work in attaching, detaching, and replacing the detection unit 38.

The invention claimed is:

1. An automatic faucet device configured to be attached to a sink or a wall portion near the sink, the automatic faucet device comprising:
   a faucet comprising a water discharge port;
   a detection unit attachment portion provided in the faucet;
   a detection unit that is detachably provided in the detection unit attachment portion and configured to detect part of a human body; and
   a control unit configured to switch between discharge and stop of water from the water discharge port in accordance with a detection signal output from the detection unit;
   the detection unit being either a first detection unit comprising a non-contact sensor configured to detect the part of the human body in a non-contact manner or a second detection unit comprising a contact sensor configured to detect the part of the human body when contacted by the part of the human body,
   both the first detection unit and the second detection unit configured to be selectively attached to or detached from the detection unit attachment portion, and
   the first detection unit and the second detection unit being interchangeable without modification of any portion of the faucet other than the first detection unit or the second detection unit.

2. The automatic faucet device according to claim 1, wherein
   the detection unit is any one of the first detection unit, the second detection unit, and a third detection unit comprising both the non-contact sensor and the contact sensor, and
   the third detection unit is configured to be selectively attached to or detached from the detection unit attachment portion.

3. The automatic faucet device according to claim 2, wherein
   the faucet comprises
   a base portion configured to be attached to the sink or the wall portion,
   an extending portion extending above a hand wash bowl of the sink from the base portion, and
   a water discharge portion that is provided on a tip portion of the extending portion and comprises the water discharge port, and
   the detection unit attachment portion is provided on an upper surface of the water discharge portion.

4. The automatic faucet device according to claim 3, wherein
   the detection unit attachment portion is formed of a recess portion opening upward on the upper surface of the water discharge portion, the detection unit comprises a case configured to support one or both of the non-contact sensor and the contact sensor, and the case is detachably attached to the recess portion.

5. The automatic faucet device according to claim 2, wherein the faucet comprises a base plate portion configured to be attached to the sink or the wall portion, an extending portion extending above a hand wash bowl of the sink from the base plate portion, and a water discharge portion that is provided on a tip portion of the extending portion and comprises the water discharge port, and the detection unit attachment portion is provided in the base plate portion aligned with the extending portion.

6. The automatic faucet device according to claim 5, wherein the detection unit attachment portion is formed of a recess portion provided in the base plate portion, the detection unit comprises a case configured to support one or both of the non-contact sensor and the contact sensor, and the case is detachably attached to the recess portion.

7. The automatic faucet device according to claim 6, wherein the recess portion comprises an attachment-portion-side connector connected to the control unit, and the case comprises a detection-unit-side connector that is connected to one or both of the non-contact sensor and the contact sensor and configured to be coupled to the attachment-portion-side connector.

8. The automatic faucet device according to claim 1, wherein the faucet comprises a base portion configured to be attached to the sink or the wall portion, an extending portion extending above a hand wash bowl of the sink from the base portion, and a water discharge portion that is provided on a tip portion of the extending portion and comprises the water discharge port, and the detection unit attachment portion is provided on an upper surface of the water discharge portion.

9. The automatic faucet device according to claim 8, wherein the detection unit attachment portion is formed of a recess portion opening upward on the upper surface of the water discharge portion, the detection unit comprises a case configured to support one or both of the non-contact sensor and the contact sensor, and the case is detachably attached to the recess portion.

10. The automatic faucet device according to claim 9, wherein the recess portion comprises an attachment-portion-side connector connected to the control unit, and the case comprises a detection-unit-side connector that is connected to one or both of the non-contact sensor and the contact sensor and configured to be coupled to the attachment-portion-side connector.

11. The automatic faucet device according to claim 1, wherein the faucet comprises a base plate portion configured to be attached to the sink or the wall portion, an extending portion extending above a hand wash bowl of the sink from the base plate portion, and a water discharge portion that is provided on a tip portion of the extending portion and comprises the water discharge port, and the detection unit attachment portion is provided in the base plate portion aligned with the extending portion.

12. The automatic faucet device according to claim 11, wherein the detection unit attachment portion is formed of a recess portion provided in the base plate portion, the detection unit comprises a case configured to support one or both of the non-contact sensor and the contact sensor, and the case is detachably attached to the recess portion.

* * * * *